United States Patent
Oh

(10) Patent No.: US 9,359,982 B2
(45) Date of Patent: Jun. 7, 2016

(54) AIR CLEANER ASSEMBLY AND FILTER ELEMENT PROVIDING IMPROVED DYNAMIC WALL STIFFNESS

(75) Inventor: Dal Jin Oh, Gyeonggi-do (KR)

(73) Assignee: MANN + HUMMEL GMBH, Ludwigsburg (DE)

( * ) Notice: Subject to any disclaimer, the term of this patent is extended or adjusted under 35 U.S.C. 154(b) by 115 days.

(21) Appl. No.: 13/979,364

(22) PCT Filed: Jan. 10, 2012

(86) PCT No.: PCT/EP2012/050306
§ 371 (c)(1),
(2), (4) Date: Aug. 7, 2013

(87) PCT Pub. No.: WO2012/095419
PCT Pub. Date: Jul. 19, 2012

(65) Prior Publication Data
US 2013/0305930 A1    Nov. 21, 2013

Related U.S. Application Data

(60) Provisional application No. 61/431,461, filed on Jan. 11, 2011.

(51) Int. Cl.
| | | |
|---|---|---|
| *B01D 50/00* | (2006.01) | |
| *B01D 51/00* | (2006.01) | |
| *B01D 39/00* | (2006.01) | |
| *B01D 41/00* | (2006.01) | |
| *B01D 46/00* | (2006.01) | |
| *B01D 49/00* | (2006.01) | |
| *F02M 35/14* | (2006.01) | |
| *B01D 46/10* | (2006.01) | |
| *B01D 46/42* | (2006.01) | |

(Continued)

(52) U.S. Cl.
CPC ........... *F02M 35/14* (2013.01); *B01D 46/0002* (2013.01); *B01D 46/10* (2013.01); *B01D 46/4236* (2013.01); *B01D 46/521* (2013.01); *F02M 35/0245* (2013.01); *F02M 35/02425* (2013.01); *F02M 35/02491* (2013.01); *F02M 35/0203* (2013.01)

(58) Field of Classification Search
CPC .................. B01D 2201/0415; B01D 2201/04; B01D 46/2411; B01D 46/2414; F02M 35/0201
USPC .................................................. 55/498, 385.3
See application file for complete search history.

(56) References Cited

U.S. PATENT DOCUMENTS 2,869,694 A * 1/1959 Breckheimer .................. 52/658
5,935,282 A * 8/1999 Lin ............................. 55/385.6

(Continued)

FOREIGN PATENT DOCUMENTS

| DE | 20062004927 U | 8/2007 |
| GB | 2348153 A | 9/2000 |

(Continued)

*Primary Examiner* — Amber R Orlando
(74) *Attorney, Agent, or Firm* — James Hasselbeck

(57) ABSTRACT

An air cleaner assembly and a filter element reduce wall noise by rigidly coupling the movement of opposing air cleaner housing sidewalls through the installed filter element. The sidewalls are rigidly coupled through the filter element with the sidewalls coupled to move together in unison such that wall deflection forces created by the pressure pulsations tend to cancel each resulting in improved dynamic stiffening of the air cleaner walls and reduced wall noise.

10 Claims, 4 Drawing Sheets

(51) Int. Cl.
*B01D 46/52* (2006.01)
*F02M 35/024* (2006.01)
*F02M 35/02* (2006.01)

(56) References Cited

U.S. PATENT DOCUMENTS

| | | | |
|---|---|---|---|
| 6,425,932 B1 * | 7/2002 | Huehn et al. | 55/471 |
| 6,494,940 B1 * | 12/2002 | Hak | 96/224 |
| 6,679,940 B1 * | 1/2004 | Oda | 96/55 |
| 6,890,366 B2 * | 5/2005 | Bugli et al. | 55/385.3 |
| 7,763,105 B2 * | 7/2010 | Ye et al. | 96/401 |
| 7,785,403 B2 * | 8/2010 | Ouyang et al. | 96/18 |
| 7,972,401 B2 * | 7/2011 | Stock et al. | 55/483 |
| 8,613,785 B1 * | 12/2013 | Davis | 55/495 |
| 8,828,115 B2 * | 9/2014 | Gillispie et al. | 55/499 |
| 2006/0021932 A1 * | 2/2006 | Darnell et al. | 210/459 |
| 2007/0012192 A1 * | 1/2007 | Pippel et al. | 96/417 |
| 2007/0193236 A1 * | 8/2007 | Merritt | 55/498 |
| 2007/0261375 A1 * | 11/2007 | Paterson et al. | 55/471 |
| 2009/0064647 A1 | 3/2009 | Darnell | |
| 2010/0236205 A1 * | 9/2010 | Braithwaite et al. | 55/499 |
| 2011/0030322 A1 * | 2/2011 | Gillispie et al. | 55/313 |

FOREIGN PATENT DOCUMENTS

| | | |
|---|---|---|
| JP | 8243334 A | 9/1996 |
| JP | 2005140021 A | 6/2005 |

* cited by examiner

AIR CLEANER ASSEMBLY AND FILTER ELEMENT PROVIDING IMPROVED DYNAMIC WALL STIFFNESS

CROSS REFERENCE TO RELATED APPLICATIONS

This application is US National Stage Entry of international patent application no. PCT/EP2012/050306, filed Jan. 10, 2012 designating the United States of America, the entire disclosure of which is incorporated herein by reference. PCT/EP2012/050306 claims priority to U.S. provisional patent application No. 61/431,461 filed Jan. 11, 2011.

TECHNICAL FIELD

The present disclosure relates to air induction systems for internal combustion engines and, more particularly, to apparatus and methods of reducing wall noise in air cleaner housings installed in air induction systems.

BACKGROUND OF THE INVENTION

To reduce component costs and remove weight from the vehicle, air induction systems may be comprised of relatively lightweight and somewhat flexible molded plastic ducts and air cleaner housings (also known as air filter housings). Air cleaner housings may have comparatively large substantially flat sidewalls that are particularly sensitive to air pressure pulsations in the air induction system. Air pressure pulsations are known to arise from the operation of the internal combustion engines, such as from the opening and closing of engine air intake valves resulting in pressure variations or "pulsations" within the air intake tract that may then radiate as noise through the sidewalls of the air induction system and air filter housing.

The sidewalls of an air cleaner housing generally have a natural resonant frequency at least partially determined by the wall thickness, material properties of the materials used to form the walls, the possible presence of internal ribbing structures molded to the housing walls and other geometric considerations including wall size, shape, as well as other factors. When it occurs that air pressure pulsations in the air induction system substantially coincide with the natural resonant frequency of air cleaner housing sidewalls, then movement or deflection of the sidewalls may be accentuated by the resonance resulting in the generation of noise, both outside of the housing and internally in the air intake tract. The noise generated by the defection of the air cleaner housing sidewalls due to the influence of pressure pulsations in the air intake tract is referred to herein generally as "wall noise".

It is known to apply certain technologies to cancel or absorb engine air intake tract noise. For example, resonators, quarter wave tuners, and expansion chambers may be provided in or connected to the air intake tract to provide frequency cancelation of noise. With wall noise however, the noise is generated on external wall surfaces of the air cleaner housing and then radiates in the environment outside of the air intake tract. Conventional noise reduction technologies such as resonators, quarter wave tuners, and expansion chambers are of little benefit in reducing wall noise, so other inventive solutions are required.

Therefore, there remains a need in the art for an air cleaner assembly configured to reduce the generation of wall noise.

SUMMARY OF THE INVENTION

It is an objective of the present inventive disclosure to provide an air cleaner assembly configured to reduce wall noise.

It is another objective of the present inventive disclosure to provide an air cleaner assembly that reduces wall noise by rigidly coupling the movement of opposing air cleaner housing side walls through the filter element installed into the air cleaner housing. This is particularly advantageous as, for example, a pressure increase in the air cleaner housing may tend to deflect opposing sidewalls outwardly and in opposite directions. However, when the sidewalls are rigidly coupled through the filter element then the wall deflection forces created by the pressure increase tend to cancel each other through the rigid coupling provided through the filter element. Further details of how this is accomplished are provided herein.

An air cleaner assembly having improved dynamic wall stiffness includes an air filter element having a filter media for filtering an air stream in the air cleaner. In some aspects or variations of the invention the filter element may include a substantially rigid frame member that surrounds a flow aperture covered by the filter media. In aspects having the frame member, the frame member supports the filter media and has a frame body that circumferentially surrounds the flow aperture. A flange for mounting the filter element in an air cleaner housing may be secured to the frame body or otherwise secured to the filter element and extend generally outwardly relative to the flow aperture. To provide further improved dynamically stiffening of the walls of the air cleaner, the filter element in some aspects or variations of the invention may be provided with one or more wall stiffening members. The stiffening members may include elongated locking members secured and positioned at opposing sidewalls of the filter element. In aspects having a frame member, the locking members may preferably be secured onto the frame member and positioned at opposing sidewalls of the filter element. The locking members may extend in an axial flow direction at least partially along the depth of the sidewall of the filter element. In aspects of the invention having at least one stiffening rib, the substantially rigid elongated stiffening rib extends laterally across the flow aperture proximate to the filter media between the two locking members at the opposing filter sides. The stiffening rib or ribs may be secured at opposing ends to a respective one of the locking members.

The air cleaner assembly includes an air cleaner housing having separable first housing and second housing shells. The first and second housing shells are separable for installation and removal of the filter element for service. Secured to opposing sidewalls of at least one housing shell is a plurality of locking receptacles configured to demountably and lockably engage the locking members of the filter element. The lockable engagement rigidly and detachably couples the opposing sidewalls of the housing shells through the stiffening members of the filter element. The rigid coupling provides dynamic stiffening of the sidewalls through the stiffening members of the filter element. The dynamic wall stiffening through the filter element provides reduced air cleaner housing wall noise by stiffening of the side walls against pressure pulsations present in an air stream in the air cleaner housing and minimizes wall deflections by coupling wall movements through the filter element so that pressure pulsation forces on opposing air cleaner housing walls tend to cancel through the stiffening members.

According to another aspect of the invention, at least one tab member extends axially outwards from at least one end of the locking members.

According to another aspect of the invention, the locking member includes at least one tab member provided on both opposing ends of the locking members. Locking receptacles are provided on and secured to opposing sidewalls of both housing shells. The locking receptacles are positioned to lockably engage with the tab members of the locking members of the filter element to dynamically couple the opposing housing walls and provide dynamic stiffening of the walls.

According to another aspect of the invention, the locking receptacles include a first and a second wall member with the wall members spaced apart in a substantially parallel relationship forming a receptacle gap therebetween. The receptacle gap receives the tab member or members of the respective locking member, preventing movement of the locking member relative to the locking receptacle in an inwardly and outwardly direction.

According to another aspect of the invention the opposing end of the locking members are provided with two tab members spaced apart to form a notch therebetween. The two tab members with the notch are provided on and extend axially outwards from at least one end of the locking members. The locking receptacles include a tongue member positioned in the receptacle gap between the wall members with the tongue member received into the notch between the two tab members of the locking member. The tongue member engaging the notch prevents movement of the locking member relative to the locking receptacle in a third direction aligned with the receptacle gap.

According to another aspect of the invention the locking receptacles are provided on the sidewalls of both the first and second housing shells and tab member are provided on both ends of the locking members. The engagement of the locking members at the opposing ends into the locking receptacles of the first and second housing shells prevents movement of the locking members relative to the locking receptacles in a direction aligned with an opening direction of the air cleaner housing.

According to another aspect of the invention, the filter element frame member including the frame body, elongated locking members and stiffening ribs is a one-piece unitary component and not separate components secured together.

According to another aspect of the invention, the housing shells and locking receptacles are a unitary one-piece molded component. The locking receptacles being molded together with and permanently integrated and mounted to the shell.

According to another aspect of the invention, a filter element is provided as describe above as a replacement or service part for the air cleaner assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Corresponding reference numerals indicate corresponding parts throughout the several views of the drawings.

Figure 1:
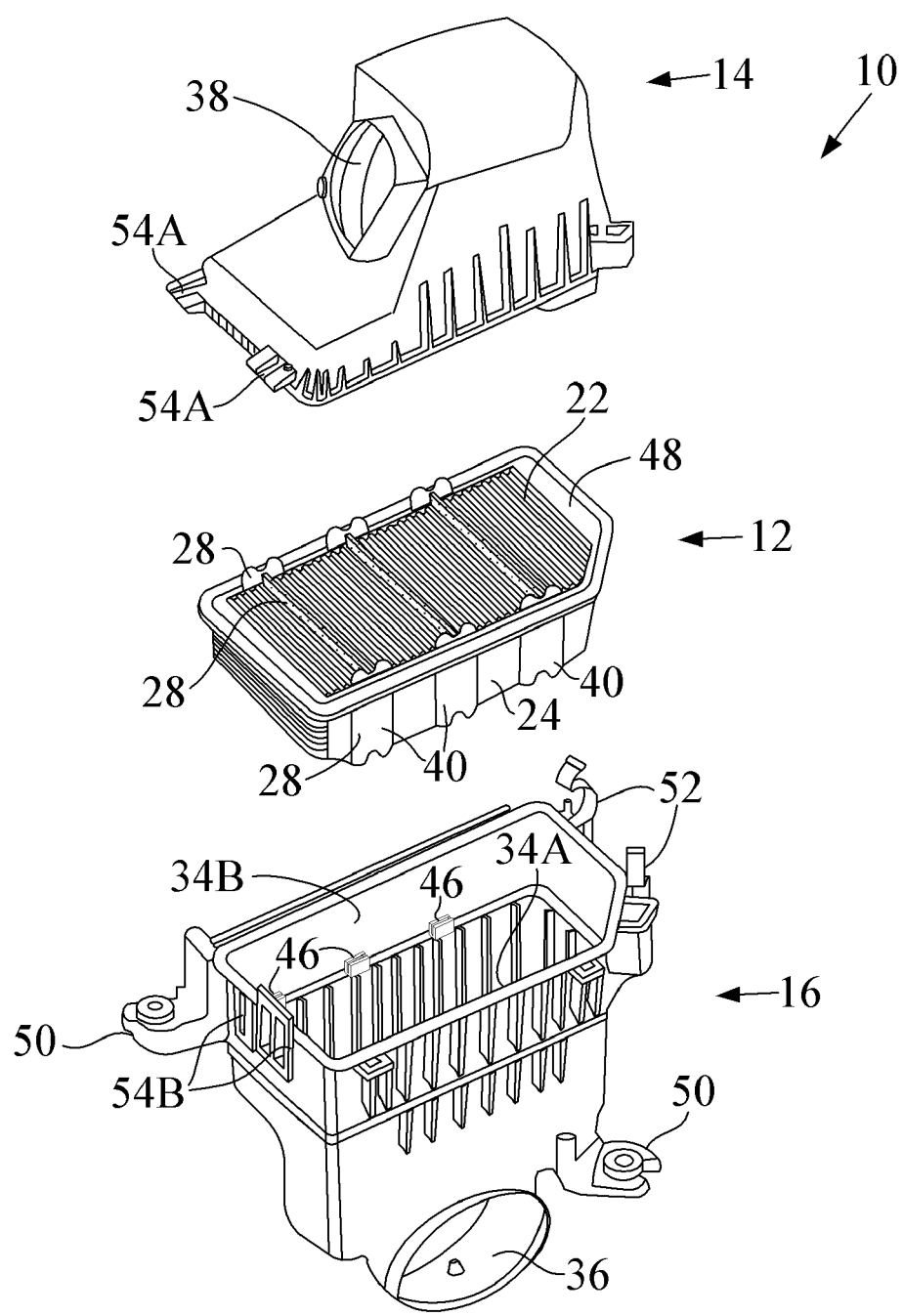
FIG. 1 depicts an exploded assembly view of an air cleaner assembly providing improved dynamic wall stiffness, consistent with the inventive disclosure herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to the reduction of air cleaner housing wall noise by providing dynamic wall stiffening components integrated with the replaceable filter element. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to air cleaner assembly view of FIG. 1, the air cleaner housing 14 and 16 of an improved air cleaner 10 may preferably be formed of injection molded plastic, nylon, fiberglass reinforced plastic or other non-porous moldable materials as known to those skilled in the art. Typically air cleaner housing sidewalls, however they are made, are known to be at least somewhat flexible and therefore susceptible to the influence of pressure pulsations or variations within the air cleaner housing or air cleaner housing which may result in an undesirable phenomena known as "wall noise". Wall noise, as defined herein, is the noise generated by the sympathetic deflection of air cleaner housing walls in response to pressure variations within the air cleaner housing, or pressure differences between the interior and exterior of the air cleaner housing. The air cleaner housing walls will have a natural resonant frequency. When the frequency of pressure pulsations approaches the natural resonant frequency of the housing walls then the wall deflection is enhanced resulting in the generation of wall noise within and external to the air cleaner housing.

Continuing with FIG. 1, the air cleaner 10 includes a first housing shell 14 and a mateable second housing shell 16, which when mated, form the air cleaner housing. The housing shells 14 and 16 are detachably joinable along cooperatively configured mating sidewalls of housing shells 14 and 16. The housing shells 14 and 16, when detachably mated together, define an interior cavity into which a filter element 12 is replaceably installed. In FIG. 1, housing shell 16 is provided with an airflow port 36 connectable to an air intake tract. Housing shell 16 in the illustrated embodiment may be considered as an air cleaner housing base and housing shell 14 may be considered as an air cleaner housing cover. These designations are only relative and presented for one possible configuration of the invention. Port designations for inlet and out may be freely interchanged without effect and are not to be understood as critical or limiting to the present invention. The illustrations and designations are intended only for enablement and disclosure purposes.

Similarly housing shell 14 is provided with an airflow port 38 connectable to an air intake tract. In the illustrated embodiment of FIG. 1, port 38 may be considered as a filtered air outlet port and port 36 may be considered as an air inlet port for air to be filtered, although the designations of ports 36 and 38 may be interchanged in other variations of the invention without deviating from the inventive concepts disclosed herein.

Continuing with reference to FIG. 1, the filter element 12 includes a pleated filter media 22 having pleats extending between housing shell sidewalls of the filter element 12 (Nearest sidewall 24 shown, opposing sidewall similarly configured but not visible in FIG. 1). Although a pleated filter media is shown, other filter media types may be used without deviating from the present inventive disclosure. As discussed earlier, in some aspects of the invention the filter media 22 is surrounded along peripheral media edges and supported by a substantially rigid frame member 48. Although in preferred embodiments the frame member is substantially rigid, this is not required for all embodiments. In aspects of the invention including the frame member, only certain components of the frame member 48 would need to be substantially rigid, particularly components of the stiffening members as discussed in later sections herein.

Visible on the visible sidewall 24 of the filter element 12 are a plurality of wall stiffening members 28. The wall stiffening members 28 will be discussed in further detail in description of other drawings in later sections herein.

Illustrated secured to the inner surface of the sidewalls 34A and 34B in the second housing shell 16 are a plurality of locking receptacles 46. The locking receptacles 46 lockably and detachably engage with the elongated locking members 40 of the filter element when the filter element is installed into the air cleaner housing shell 16. As can be readily understood, the locking members 40 of the filter element are received into the locking receptacles 46 of the housing shell 16 when the filter element is inserted into the housing shell 16 in an assembly direction.

Additionally, either or both of the housing shells 14 and 16 may also be provided with mounting features 50 as may be required to mount and support the housing shells 14 and 16 on a surface, for example within an engine compartment of a motor vehicle. Air cleaner housing shells 14 and 16 may further be provided with spring clips 52 complimenting engageable tab and slot arrangements 54A and 54B operable to securely hold the housing shells detachably mated and sealed together with the filter element 12 therein.

Figure 2:
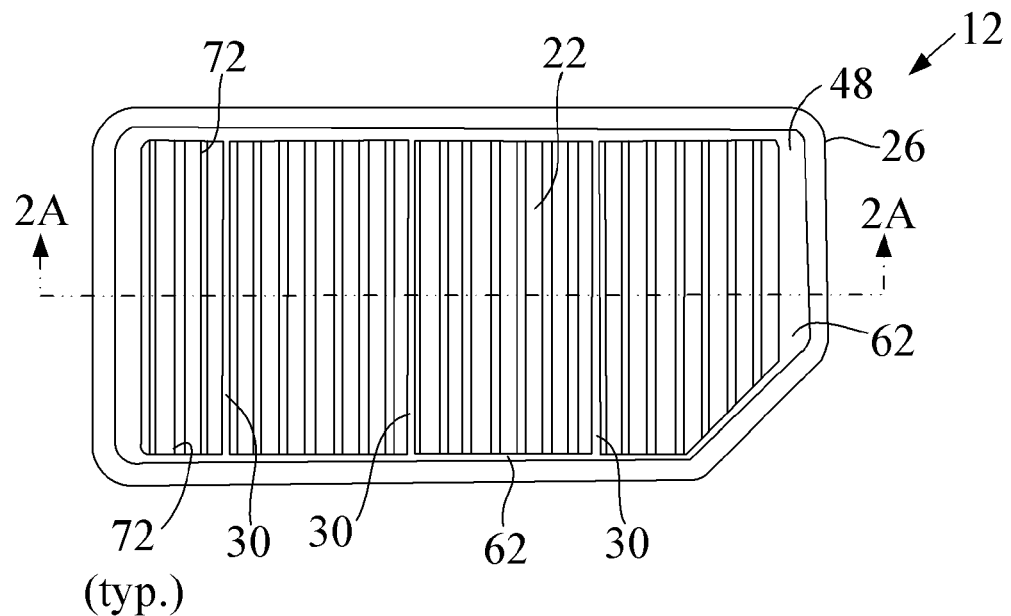
FIG. 2 depicts a top view of a filter element including features of the present inventive disclosure.
Figure 2A:
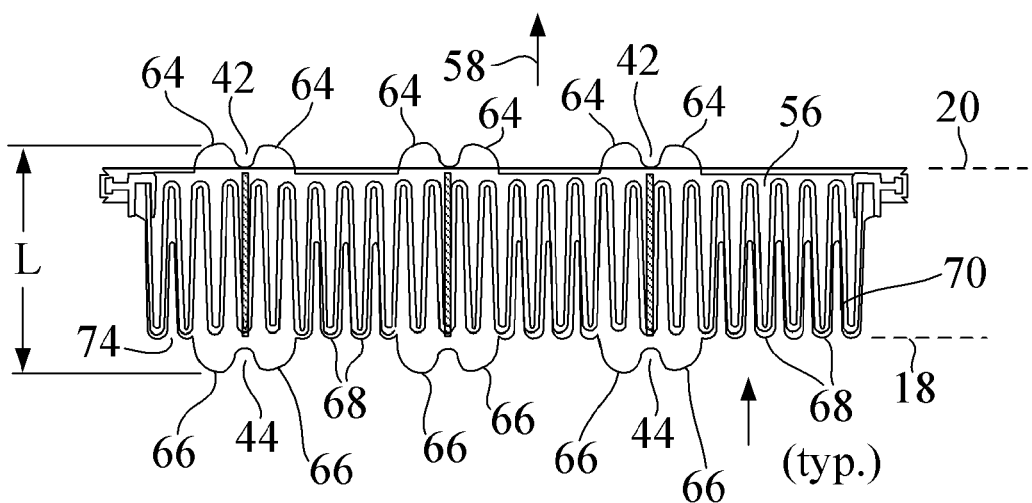
FIG. 2A depicts a sectional view of the filter element in FIG. 2 taken along cutting plane 2A-2A of FIG. 2.
Figure 3:
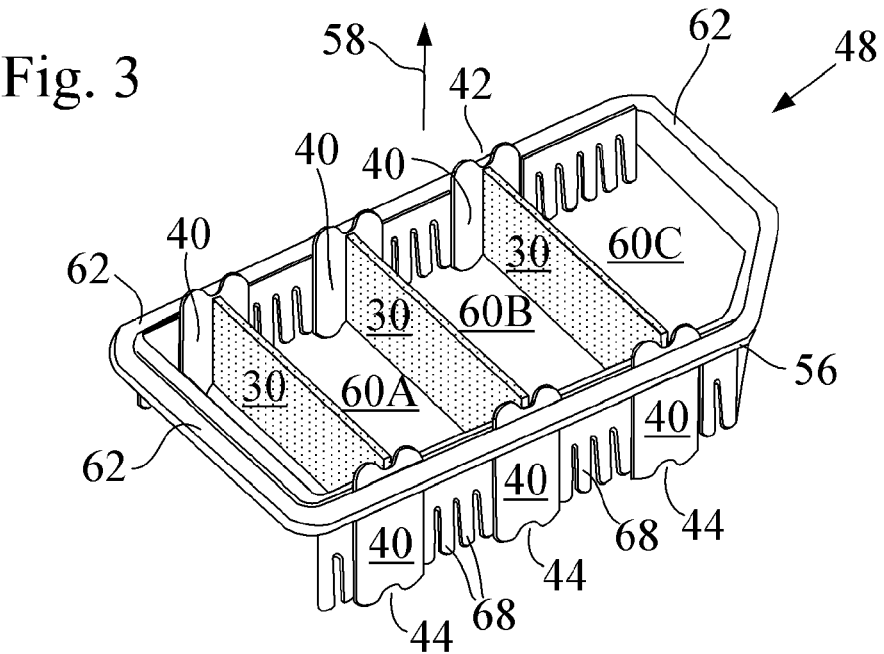
FIG. 3 depicts a perspective view of the rigid frame member of the filter element in FIGS. 2 and 2A, illustrating features of the present inventive disclosure.

The discussion is now directed to FIGS. 2, 2A and 3.

FIG. 2 depicts a top view of a filter element 12 including features of the present inventive disclosure and including a frame member 48, although the frame member is not required for all aspects or variations of the present inventive disclosure. FIG. 2A depicts a sectional view of the filter element 12 depicted in FIG. 2 taken along cutting plane 2A-2A of FIG. 2. FIG. 3 depicts a perspective view of the rigid frame member of the filter element in FIGS. 2 and 2A, the frame shown alone without the filter media 22 and elastomeric seal 26, illustrating features of the frame member 48 of the present inventive disclosure.

Some features of the frame member are best shown in FIG. 3 although other aspects are presented in FIGS. 2 and 2A. The frame member 48 is preferably substantially rigid and is preferably made of a moldable material such as suitable molded plastic material although other materials such as metals and ceramics as well as other suitable materials know to those skilled in the art may also be employed without deviating for the inventive concepts presented herein. The frame member 48 has formed therethrough a flow aperture (for example, summation of apertures 60A, 60B and 60C in FIG. 3). The frame member 48 may include a frame body 56 that extends in a direction substantially aligned with the axial air flow direction 58 and may additionally form portions of the sidewalls 24 of the filter element 12. Secured to the filter element 12 and/or the frame body 56) is a flange 62 that is preferably arranged substantially parallel to the flow faces 18 and 20 of the filter element 12.

At least in some embodiments, portions of the flange 62 extend radially outwardly from said frame body 56. The flange 62 is preferably configured to support the filter element 12 by engaging between the mating sidewalls of the mating housing shells 14 and 16 in a seal tight way such that the portion of the housing chamber within shell 14 is sealably separated from the portion of the housing chamber in shell 16, thereby requiring air flow between the housing chamber portions to flow through the filter element 12. The flange 62 also advantageously serves to support the elastomeric seal 26 which forms a seal between the filter element 12 and the air cleaner housing shells 14 and 16.

The frame member may include one or more wall stiffening members 28. Each wall stiffening member 28 includes an elongated stiffening rib 30 having opposing ends secured to and extending between two distally spaced elongated locking members 40. Elongated locking members 40 are arranged at opposing sides of the filter element 12 or the annular frame body 56 and may be secured to the frame member 48, preferably to the frame body 56. It is desirable that the stiffening ribs 30 and elongated locking members 40 be substantially non elastic and non-compressible in the axial direction of the elongated stiffening ribs 30, at least within the force ranges experienced during operation of the air cleaner so that the wall stiffening member components are operable to efficiently transfer housing wall movement (wall deflections)

and forces (induced through pressure pulsations) through the filter element frame member 48 to the opposing sidewalls of the housing.

In an illustrated preferred embodiment of FIGS. 2A and 3, the elongated locking members 40 may be provided on at least one axially opposing end (and preferably at both opposing ends) with two spaced extending tab shaped members 64 with a slot (42 or 44) formed therebetween. The tab members 64 and slot 42 are configured to lockably engage with complimentary configured locking receptacles 46 provided on and secured on the air cleaner housing walls, as will be discussed in more detail below. In other embodiments the spaced tab member pairs 64 and/or 66 may be replaced by a single tab member without the slot. Other types of detachable locking arrangements between the locking members 40 and the locking receptacles 46 known to those skilled in the art may be advantageously applied without deviating from the inventive disclosure presented herein for stiffening housing sidewalls through the filter element.

In preferred embodiments, the frame body includes a plurality of axially extending pleat support members 68. By comparing FIG. 3 with the sectional view of FIG. 2A it can be seen that the axially extending pleat support members 68 are preferably secured to the frame body 56 and may be arranged in a spaced parallel relationship. The spacing, width and length of the extending pleat support members 68 are configured to abut with and cover the edges of the axially extending pleats 70 of the filter media 22. The configuration of the axially extending pleat support members 68 abutting and covering the edges of the pleats advantageously provides a surface onto which the ends of the pleats can be sealably and supportively secured. Securing the pleat edges 72 of the filter media 22 to the axially extending pleat support members 68 provides at least three benefits. First, sealably securing the pleat edges 72 to the axially extending pleat support members 68 ensures a seal between the incoming flow face 18 and the outgoing flow face 20 of the filter element 12, thereby requiring air flow in the air cleaner 10 to flow through the pleated filter media 22 and not bypass the filter media between the pleat edges 72 and the frame member 48. Second, with the pleat edges 72 secured to the axially extending pleat support members 68 the pleats are fixed into the desired position and fixed in spacing along the opposing sides of the frame body 56. Third, the gaps 74 provided between the spaced axially extending pleat support members 68 reduces the material used in the frame member, thereby reducing cost, weight and raw material usage.

Now referring to FIGS. 1, 2, 2A, 4A, and 4B taken together.

Received into the grooves formed by the pleats 70 of the filter media 22 are a plurality of elongated stiffening ribs 30, which in the particular illustrated variation or aspect of the invention, extend across an outgoing flow face 20 of filter element 22. Alternately the stiffening ribs 30 may be configured to extend across an incoming flow face 18 of filter element 22. The flow face designations (incoming vs. outgoing) are arbitrary and may be reversed without deviating from the present inventive disclosure. This is to say that the air flow through the filter element 12 may be from the lower flow face 18 to the upper flow face 20 or in reverse from the upper flow face 20 to the lower flow face 18 without changing the structure of the filter element 12 and the arrangement of the stiffening ribs 30.

Secured to opposing ends of the stiffening ribs 30 are elongated locking members 40. Locking members 40 may be provided with an upper notch 42 and/or a lower notch 44 arranged on the locking member 40.

In the illustrated variation of the invention, the locking members 40 are aligned with and rest against the opposing sidewalls 24 of the filter element 12 and preferably have a length L sufficient to extend at least out to and between flow faces 18 and 20 of filter element 12. It is advantageous to configure the locking members 40 to extend beyond the flow faces 18 and 20 so they may freely engage the locking receptacles 46 secured on the housing shell sidewalls.

Secured to opposing sidewalls 34A and 34B of the second housing shell 16 are a plurality of locking receptacles 46. The locking receptacles 46 are positioned and aligned on the sidewalls 34A and 34B such that they mesh with and lockably engage with the notches 44 and tab members 66 of the elongated locking members 40 of the filter element 12 when the filter element is properly installed into the housing shell 16.

The lockable engagement of the elongated locking members 40 and the locking receptacles 46 substantially rigidly couples the sidewalls 34A and 34B through the wall stiffening members 28 (comprising stiffening ribs 30 and associated locking members 40) of the filter element 12. The stiffening members 28 are substantially rigid and non-compressible in the axial direction of the ribs 30 and are preferably formed of molded plastic materials. The rigid coupling of the opposing sidewalls 34A and 34B through the wall stiffening members 28 provides dynamic stiffening of the opposing air cleaner housing walls 34A and 34B by transferring forces through the wall stiffening members 28, thereby coupling the opposing housing 34A and 34B walls to deflect or move in unison.

For example, the sidewalls 34A and 34B of the second housing shell 16 and/or the sidewalls 32A and 32B of the first housing shell 14 may move, bend or deflect in response to pressure pulsations or pressure waves within the air intake tract (and therefore within the air cleaner housing shells 14 and 16). The sidewall deflection may be a movement or a bending of the sidewall inwardly or outwardly relative to the enclosed cavity within the air cleaner housing shells 14 and 16. The deflection of the air cleaner housing sidewalls allows pressure pulsations to be at least partially absorbed and transmitted through the sidewalls of the air cleaner housing 14 and 16 and thereby radiate to the exterior of the air cleaner housing, which may (without the present invention) result in wall noise.

Similarly, the opposing sidewalls 32A and 32B of the first housing shell 14 may be, in some embodiments, include a plurality of locking receptacles 46 secured to the sidewalls 32A and 32B.

The locking receptacles may, in some embodiments, be secured to the sidewalls 32A, 32B, 34A, 34B by any known means including adhesives, laser welding, ultrasonic welding, as well as by various types of fasteners. In preferred embodiments, the locking receptacles 46 are a unitary one-piece construction with sidewalls of the respective housing shell (14, 16). This is to say the locking receptacles 46 are preferably molded together with the housing shells as a one-piece component unitary component.

Figure 4A:
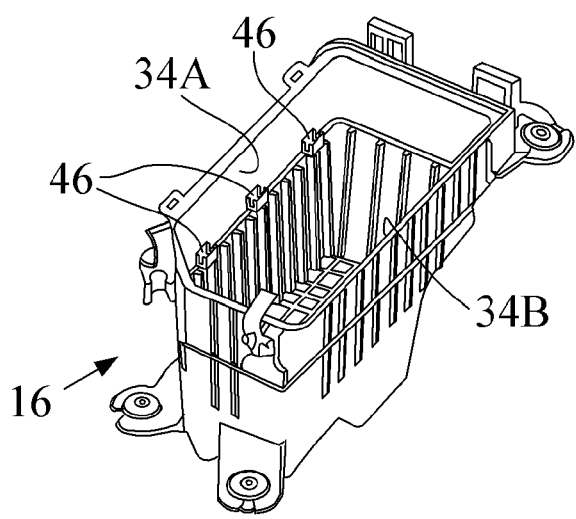
FIG. 4A depicts a perspective view of an air cleaner housing base shell including features of the present inventive disclosure.
Figure 4B:
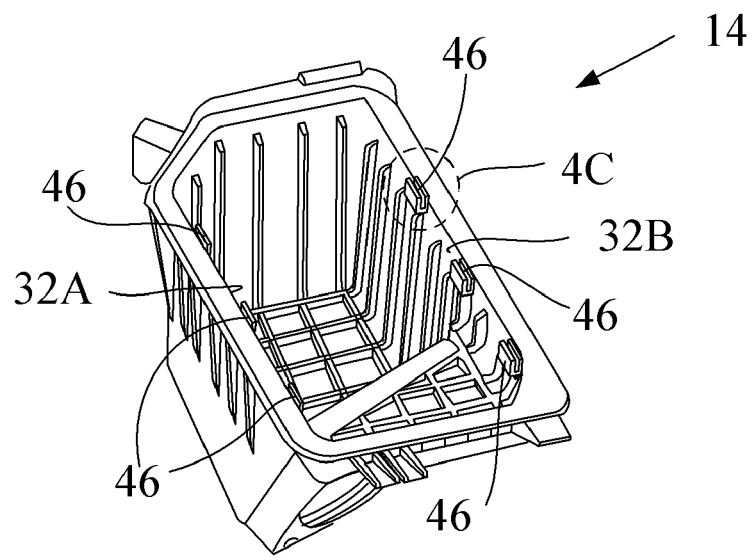
FIG. 4B depicts a perspective view of an air cleaner housing cover shell including features of the present inventive disclosure.
Figure 4C:
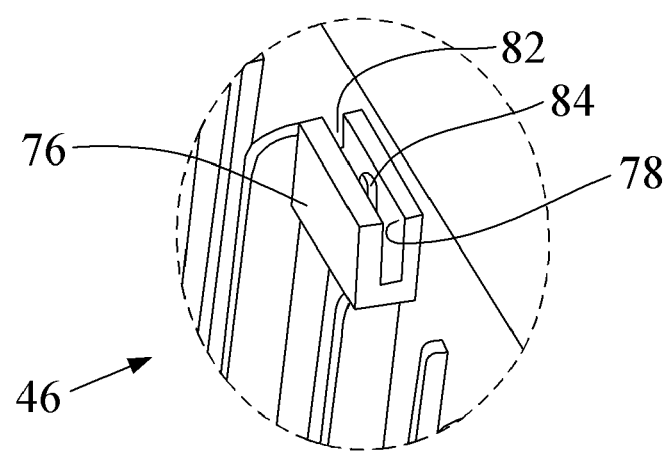
FIG. 4C depicts an enlarged view of one embodiment of a locking receptacle secured to the wall of a housing shell, consistent with the present inventive disclosure.

FIG. 4C illustrates a preferred embodiment of the locking receptacles 46. FIG. 4C is an enlargement of the dashed circular area "4C" of FIG. 4B. The illustrated locking receptacle 46 in FIG. 4C includes an inwardly arranged wall member 76 and an outwardly arranged wall member 78, which are positioned in a spaced parallel relationship. The wall members 76 and 78 define a receptacle gap 82 therebetween. When the filter element is installed and the housing shells (14 and 16) closed, the tab shaped members (64, 66) of the filter element's elongated locking members 40 are received into the gap 82 between the wall members (76 and 78) of the locking receptacles 46. Preferably (although not necessarily) the tab shaped members (64, 66) of the locking members 40 are received into the gap 82 between the wall members (76 and 78) with an interference fit such that any inwardly or outwardly deflection of the housing shell sidewalls (32A, 32B, 34A, 34B) is directly transmitted through the wall stiffening members 26 comprising the elongated stiffening rib 30 and spaced elongated locking members 40 such that opposing shell sidewalls (32A, 32B of shell 14 and 34A, 34B of shell 16) are coupled to defect or move in unison and in the same direction. By coupling the shell sidewalls through the wall stiffening members 28 the dynamic wall stiffness of the air cleaner 10 shell walls are substantially improved with the desired and advantageous benefit of a reduced generation of wall noise arising from pressure fluctuations within the air cleaner 10.

In some embodiments the locking receptacle 46 may include a tongue member 84 positioned in and extending into the receptacle gap 82 between the inward wall member 76 and the outward wall member 78. When the filter element 12 is installed in the air cleaner and the housing shells 16 and 16 are closed together, the tongue member is received into the notch between the two tab members (64 or 66). The tongue member engaging into the notch prevents movement of the locking member 40 relative to the locking receptacle 46 in a direction aligned with the receptacle gap 82.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air cleaner assembly having improved dynamic wall stiffness, comprising:
 an air filter element having at least two opposing sidewalls, said filter element including
  a filter media filtering an air stream in said air cleaner, the filter media having an incoming flow face and an opposing outgoing flow face;
  a plurality of spaced apart wall stiffening members, each one of the wall stiffening members including
   a substantially rigid elongated stiffening rib having two opposing ends, said stiffening rib extending laterally across said filter media between said opposing sidewalls of the filter element;
   two locking members, each secured directly onto a different opposing end of the substantially rigid elongated stiffening rib, the two locking members having a first end arranged outwardly beyond the incoming flow face and an opposing second end arranged outwardly beyond the outgoing flow face;
   wherein said two locking members each include at least one tab member formed directly onto at least one end of the locking member, the at least one tab member extending axially outwards from the at least one end of said locking member;
   wherein said two locking members are elongated in an axial flow direction, said axial flow direction generally extending from said incoming flow face to said outgoing flow face;
  wherein each one of the wall stiffening members, each having the two locking members and each having the at least one tab member are spaced apart from other wall stiffening members of the plurality of wall stiffening members;
 an air cleaner housing comprising:
  a first housing shell having opposing sidewalls; and
  a second housing shell having opposing sidewalls,
  wherein said first housing shell and said second housing shell are detachably joined along mating sidewalls to form a cavity therein arranged inwardly from the opposing sidewalls into which said filter element is removably installed;
  at least two locking receptacles on one of the housing shells, said at least two locking receptacles secured onto interior sides of opposing sidewalls of said one of said housing shells, the at least two locking receptacles including:
   an outwardly arranged wall member arranged on a respective one of the opposing sidewalls of said one of said housing shells;
   an inwardly arranged wall member spaced apart an inwardly direction from the outwardly arranged wall member, such that the inwardly arranged wall member is positioned between the outwardly arranged wall member and the cavity;
   wherein the outwardly arranged wall member and the inwardly arranged wall member are spaced apart in a spaced parallel relationship forming a receptacle gap therebetween;
   wherein the first or second end of the two locking members of each wall stiffening member of the plurality of spaced apart wall stiffening members are received into and lockably engage into the receptacle gaps of a respective one of the at least two locking receptacles forming a lockable engagement
 wherein said lockable engagement rigidly and detachably couples said opposing sidewalls of at least one of said first housing shell and said second housing shell, said lockable engagement coupling and locking said opposing sidewalls together to deflect in unison with the effect of substantially canceling pressure pulsations forces on said opposing sidewalls, and
 wherein said lockable engagement is a rigid coupling providing dynamic stiffening of said at least two opposing sidewalls through said at least one wall stiffening member, said dynamic stiffening reducing housing wall noise by stiffening of said at least two opposing side walls against pressure pulsations present in an air stream in said air cleaner housing.

2. The air cleaner assembly of claim 1, wherein
 said filter element has a frame member circumferentially surrounding the filter media;
 wherein said frame member is substantially rigid and surrounds a flow aperture therethrough covered by said filter media,
 wherein said frame member includes a frame body circumferentially surrounding said flow aperture, said frame body including a flange secured to said frame body and extending generally outwardly from said flow aperture.

3. The air cleaner assembly of claim 2, wherein
said two locking members includes at least one tab member provided on opposing ends of at least one end of said two locking members, said at least one tab member extending axially outwards from said opposing ends, and
wherein said at least two locking receptacles are positioned to lockably engage with said two locking members of said filter element when said filter element is in an installed state.

4. The air cleaner assembly of claim 1, wherein said at least two locking receptacles further comprise:
a tongue member positioned in said receptacle gap between said first and second wall members, said tongue member received into said notch between said two tab members,
wherein said tongue member prevents movement of said two locking members relative to said at least two locking receptacles in a direction aligned with said receptacle gap, and
wherein engagement of said two locking members to said at least two locking receptacles is operative to prevent movement of each of the two locking members relative to engaged ones of said at least two locking receptacles in all directions.

5. The air cleaner assembly of claim 1, wherein
said frame member including said two locking members and said stiffening rib of said wall stiffening member is a one-piece unitary molded component.

6. The air cleaner assembly of claim 1, wherein
said at least two locking receptacles and said opposing sidewalls of said first or second housing shell are a unitary one-piece molded component, said at least two locking receptacles molded together with and integrated with said first or second housing shell.

7. An air filter element installable into the air cleaner housing of claim 1, the air filter element having at least two opposing sidewalls, the filter element comprising:
a filter media filtering an air stream, the filter media having an incoming flow face and an opposing outgoing flow face;
a substantially rigid frame member defining and surrounding a flow aperture therethrough, said frame member receiving and supporting said filter media, said filter media and frame member having an incoming flow face and an outgoing flow face, said frame member comprising:
a frame body circumferentially surrounding said flow aperture, said frame body including a flange secured to said frame body and extending generally outwardly from said flow aperture;
a plurality of spaced apart wall stiffening members, each one of the wall stiffening members including
a substantially rigid elongated stiffening rib having two opposing ends, said stiffening rib extending laterally across said filter media between said opposing sidewalls of the filter element;
two locking members, each secured directly onto a different opposing end of the substantially rigid elongated stiffening rib, the two locking members having a first end arranged outwardly beyond the incoming flow face and an opposing second end arranged outwardly beyond the outgoing flow face;
wherein said two locking members each include at least one tab member formed directly onto at least one end of the locking member, the at least one tab member extending axially outwards from the at least one end of said locking member;
wherein said two locking members are elongated in the axial flow direction from said incoming flow face to said outgoing flow face;
wherein said two locking members include
at least one tab member extending axially outwards from at least one end of said two locking members;
wherein each one of the wall stiffening members, each having two locking members and each having at least one tab member are spaced apart from other wall stiffening members of the plurality of wall stiffening members;
wherein said tab members of each of the spaced apart wall stiffening members of said filter element are positioned and configured to lockably engage locking receptacles on sidewalls of the air cleaner housing, forming a lockable engagement;
wherein said lockable engagement rigidly and detachably couples opposing sidewalls of the air cleaner housing through said stiffening member of said filter element.

8. The air filter element according to claim 7, wherein said two locking members includes at least one tab member provided on both opposing ends of at least one of said two locking members, said tab members extending axially outwards from said opposing ends, and wherein said tab members lockably engage with said locking receptacle of said air cleaner housing.

9. The air filter element of claim 8, wherein
said at least one tab member is two tab members, said two tab members spaced apart to form a notch therebetween,
wherein said two tab members with said notch are provided on and extend axially outwards from at least one end of said two locking members,
wherein said notch engageably receives a tongue member of said two locking members, said engaging tongue member preventing movement of said two locking members relative to said locking receptacle in a direction aligned with said gap, and
wherein engagement of said two locking members into said locking receptacles prevents movement of said two locking members relative to said locking receptacles in a direction aligned with an opening direction of said air cleaner housing.

10. The air filter element according to claim 7 wherein
said frame member including said frame body, two locking members and said stiffening rib is a one-piece unitary component.

* * * * *